United States Patent
Fawcett et al.

(10) Patent No.: US 7,640,217 B2
(45) Date of Patent: Dec. 29, 2009

(54) IDENTIFYING EXCEPTIONAL MANAGED SYSTEMS

(75) Inventors: Tom Fawcett, Mountain View, CA (US); George H. Forman, Port Orchard, WA (US); Henri Jacques Suermondt, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 994 days.

(21) Appl. No.: 10/822,066

(22) Filed: Apr. 8, 2004

(65) Prior Publication Data

US 2005/0228789 A1 Oct. 13, 2005

(51) Int. Cl.
  *G06F 15/18* (2006.01)
(52) U.S. Cl. .............. 706/12; 707/3; 709/220
(58) Field of Classification Search .......... 706/25, 706/12, 14, 45, 47; 707/3, 6; 709/220; 714/37
See application file for complete search history.

(56) References Cited

U.S. PATENT DOCUMENTS

| | | | |
|---|---|---|---|
| 2002/0107843 A1* | 8/2002 | Biebesheimer et al. | 707/3 |
| 2003/0028825 A1* | 2/2003 | Hines | 714/37 |
| 2003/0167245 A1* | 9/2003 | Murata | 706/46 |
| 2004/0078733 A1* | 4/2004 | Lewis | 714/57 |
| 2004/0243692 A1* | 12/2004 | Arnold et al. | 709/220 |

* cited by examiner

*Primary Examiner*—David R Vincent
*Assistant Examiner*—Kalpana Bharadwaj

(57) ABSTRACT

A method is provided for the identification of managed systems that are exceptional compared to comparable managed systems. The method involves selecting a set of managed systems wherein each managed system has a number of system configuration attributes and selecting a set of parameterizations relating to the managed systems. Patterns are determined for the parameterizations within the set of managed systems using a supervised machine learning algorithm. The managed systems are compared to the patterns and any managed systems that deviate from the patterns are isolated as exceptional managed systems. Isolated systems may be targeted for remedial action such as the allocation of support resources or system management resources.

22 Claims, 2 Drawing Sheets

IDENTIFYING EXCEPTIONAL MANAGED SYSTEMS

FIELD OF INVENTION

The present invention relates generally to the management of systems, and more particularly to methods and systems for identifying exceptional managed systems amongst a set of comparable managed systems for the purposes of allocating support resources and system management resources.

BACKGROUND OF THE INVENTION

System vendors and manufacturers frequently distribute "patches" or upgrades and recommend modifications to system configurations. Such modifications may be recommended in an attempt to rectify existing system faults or to bring systems in line with recommended practice. However, systems administrators are often reluctant to carry out such recommended modifications since they may lead to inadvertent destabilization of systems and could potentially introduce hitherto unknown problems to the systems.

Problems associated with the malfunctioning of computer software and hardware on a particular system are often dependent on the precise configuration of the software and hardware of that system. It is usually difficult to identify why a particular error occurs on one system when it does not occur on another. One way in which large organizations may address this issue is to ensure that all systems within the organization have identically configured software and hardware. However, this is an expensive solution and it is available only when the software and hardware requirements of all computer system users within the organization are similar.

A number of different techniques have been developed for remote management of system configuration and for the management of large numbers of systems. However, known methods and systems typically rely on either a manual comparison or on manually written scripts to carry out a comparison between reconfiguration requests and known acceptable and unacceptable configurations for a system. Such methods are inefficient and too laborious for dealing with comprehensive assessments of a large number of systems. Manual comparisons and manually written scripts are not adept at recognizing factors or patterns which result in certain configurations being acceptable or unacceptable in particular systems. Manually written scripts are usually laborious to maintain.

Some methods have been developed that are able to correlate system configurations with past system performance data, allowing them to make judgments about consequences of various configuration changes in terms of system performance. However, these methods require significant amounts of accurate performance data relating to the systems to be evaluated. Typically, such performance data is incomplete, unreliable, or simply unavailable. In these circumstances, maintenance efforts may be guided using configuration conformance data.

It would be desirable to have a method and system which assist maintenance efforts by appropriate use of configuration conformance data.

SUMMARY OF THE INVENTION

Briefly, the present invention provides a method of identifying at least one exceptional managed system amongst a set of comparable managed systems. Each managed system has a number of system configuration attributes. The method includes selecting a set of managed systems and a set of parameterizations relating to the managed systems. A pattern is determined for the parameterizations relating to the set of managed systems using a supervised machine learning algorithm. The managed systems are compared to the patterns and any managed systems that deviate from the patterns are isolated as exceptional managed systems.

DETAILED DESCRIPTION OF THE EMBODIMENTS

Figure 1:
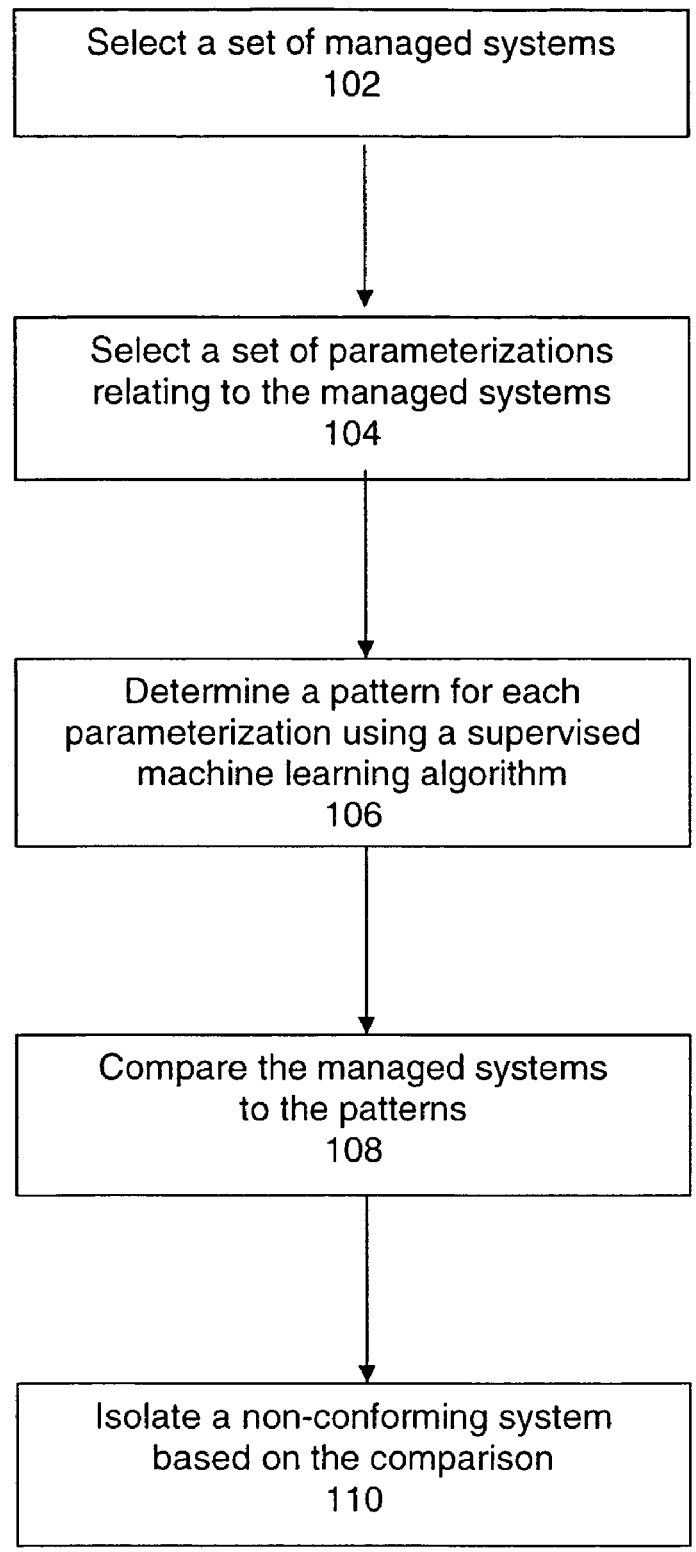
FIG. 1 is a flowchart of an embodiment of the present invention.

An embodiment of the invention is illustrated in FIG. 1. The method relates to the identification of at least one exceptional managed system amongst a set of comparable managed systems. Each managed system has a number of system configuration attributes.

The method involves selecting a set of managed systems 102. Next, a set of parameterizations relating to the managed systems is selected 104. A pattern is determined for each of the parameterizations 106, based on the system configuration attributes. The pattern is determined by means of a supervised machine learning algorithm.

The managed systems are then compared to the patterns 108. In most cases, each system will be compared to each pattern, but the method will still work if not every system and not every pattern are involved in the comparison. A managed system is then isolated, based on the comparison 110.

Embodiments of the invention relate generally to methods of identifying managed systems that are exceptional when compared to comparable managed systems. Each managed system may be described in terms of a number of system configuration attributes.

System configuration attributes are attributes relating to system configuration which may be modified, for example to enhance system performance or to enable the system to perform a particular task. A managed system may be a subsystem of another system, for example one of multiple disk drives, processors, or running processes within a computer system.

The method may relate more specifically to computer systems, wherein each computer system includes a series of system configuration attributes, such as, make and model of the system and the operating system platform, operating system patches, active processes, installed application software programs, memory configuration, peripheral devices, hardware components and other configuration settings. Hardware components include various devices including processors, memory and the like. Software relates to any programs or procedures associated with the system. Other configuration settings include aspects such as kernel parameter settings and the like.

In addition to the system configuration attributes referred to above, at various times a variety of other system attributes may be observed for a system. There is a differentiation between system configuration attributes and observed operational features, such as system load, storage throughput, number of network connections, and the like. Whilst observed operational features may be influenced or indirectly controlled by system management intervention, for the purposes of the description of the method, they are to be considered independently from system configuration attributes.

A parameterization relates generally to a setting or a series of settings for system configuration attributes and may be regarded as a constraint on the system configuration attributes. Some examples of parameters may include "Patch PHLK283 is installed"; "Kernel parameter max_thread_proc is set between 64 and 256"; "Patch PHLK283 is installed and patch PHLK280 is not installed."

The method involves determination of a pattern (also referred to as a model or a set of rules) that characterizes the system configurations that are common amongst a set of comparable managed systems. Determination of whether one managed system is comparable to one another may be performed manually by systems managers or support personnel. For example, systems that have the same or similar general descriptive system attributes including the make and model of the system, the operating system and hardware configuration may be regarded as being comparable.

Alternatively, this determination may occur via an automated classification process. Classifying a large number of systems in this way as a precondition to pattern determination enables systems that may be considered to be comparable on the basis of one or more system attributes to be grouped together.

The system attributes used to classify managed systems in the selection process are typically those system attributes which will never or only very rarely change over the lifetime of a system. Examples of such system attributes include the make and model of the system (e.g. a HP model 9000 computer system running the HP-UX 11.11 operating system). Although an operating system may be replaced on a system, such a replacement is a relatively rare event and would fundamentally alter the nature of the entire system. Other examples of what are referred to as system attributes throughout the description include the amount of memory in the system and various hardware attributes.

Alternatively, the selection and classification may be based on observed attributes, or a combination of observed attributes, system, and system configuration attributes. For example, the set of managed systems may be selected to include all HP-UX 11.0 systems that have Oracle installed and that have not had a system shutdown in the past 12 months.

Embodiments of the method involve a set of parameterizations associated with the set of comparable managed systems. The set of parameterizations may be selected as being of potential interest to a systems manager. For example, the set of parameterizations may be the set of statements "Patch X is installed" for any patch X that is installed on any of the managed systems in set of comparable systems. The set of parameterizations may be derived from the set of comparable systems, such as in this example, or it may be provided, for example when a system manager specifies a set of items of interest.

The method provides for determination of the patterns based on existing systems (which provide the test or training data) so that systems targeted for analysis may be compared to patterns that are representative of a typical comparable system.

The patterns are determined by a supervised machine learning algorithm. Supervised machine learning algorithms are based on determining a pattern from a series of known objects and then applying the pattern or model to any unknown objects which fall in the same class. Supervised machine learning algorithms are based on the assumption that objects having similar values for the target variable will also have structural similarities in relation to other variables. A target parameter may be binary, for example indicating, "the presence or absence of patch PHKL123"; or numerical such as "an integer value of max_thread_proc"; or more complex, such as the nature of the virtual memory policy, or the shape of the scheduling priority curve.

Given a target parameter, a supervised machine learning algorithm can identify similarities and describe them in the form of one or more patterns. Supervised learning algorithms are based on determining a pattern from a series of known objects and then applying the pattern or model to any unknown objects which fall in the same class. Embodiments of the present invention make use of the ability of supervised machine learning algorithms to identify such patterns, and more specifically the ability to find exceptions to the patterns.

It is to be understood that the form of pattern determination described differs somewhat from statistical methods for outlier detection. Outlier detection involves an unsupervised method which consider an entire spectrum of attributes in order to determine which systems have a configuration at variance with common practice. In contrast, the pattern determination described generates one or more patterns that formulate predictions about common system configuration attributes. The established pattern or rule may then be used to find exceptions to the rule otherwise referred to as deviations from the pattern.

Any suitable supervised learning algorithm may be used to execute the method. The machine learning algorithm used may be a rule learning technique and most preferably a decision tree learning algorithm such as C4.5. Alternatively, the method may be executed using other supervised learning methods such as support vector machines, Bayes networks, naive Bayes and the like.

The supervised machine learning algorithm is applied to each parameterization in the set of parameterizations associated with the set of managed systems, in order to determine one or more patterns or rules relating to the set of comparable managed systems. A pattern is to be determined for each parameterization in the set of parameterizations or at least most of the parameterizations within the set of parameterizations. It is intended however, that disregarding one or more parameterizations will not adversely affect the efficacy of the method.

The patterns may be generated in accordance with Boolean logic, that is, an analysis determining whether the attributes are present or absent in a given managed system. An example of a pattern or rule that may be generated by this method is "If patch X and patch Y are installed on a given system, then that system would also be expected to have patch Z installed".

The determination of a pattern may include reference to additional system configuration attributes as well as to the target parameterization set of interest. For example, the parameterization set (that is, the constraints on settings for system configuration attributes of interest) may be limited to patches installed on the system. The supervised machine learning algorithm may then learn a rule "Patch PHLK283 is installed when (a) Oracle is installed; and (b) max_thread_proc is set to 64", although conditions (a) and (b) are not part of the set of parameterizations for which a pattern is being determined.

Alternatively, determination of the pattern may involve only the particular parameterizations which are of interest. In this case, the resulting pattern will express only relationships among the parameterizations of interest. For example, considering the previous example where the set of parameterizations is limited to those related to patches installed on the systems; the supervised machine learning algorithm may learn that "Patch PHLK283 is installed when Patch PHLK280 is installed", where both "Patch PHLK283 is installed" and "Patch PHLK280 is installed" are in the set of parameterizations.

Once the patterns have been generated for the set of parameterizations, the method includes comparing the managed systems to these patterns. The managed systems are compared to the patterns to indicate whether a particular system deviates from a pattern that characterizes the configuration that is common to comparable systems. It is intended that each or at least most of the managed systems will be compared to each or at least most of the patterns determined. However, disregarding one or more systems or patterns will not adversely affect the efficacy of the method.

Systems that do not conform to the pattern, for example because they are exceptions to a rule generated by the machine learning algorithm, are identified and isolated. Isolation may involve putting the system on a list of systems for further investigation, or highlighting the system in some other way as a system potentially warranting further attention, or it may involve physical isolation of the system or moving critical applications off the system, for example in the case when there is reason to believe that the system is not sufficiently reliable to be part of a critical business function. Isolated systems may be targeted for remedial action which may involve modification of system configuration or installation or removal of patches.

A list of isolated systems may be compiled. This list may also be displayed. The display may include system configuration attributes or other relevant information. The display may include information about a pattern that led to the isolation of one or more systems. The list may be based on or ordered by measures indicative of the results of comparing the managed systems against the pattern. The list may be based on or ordered by the priority value of an isolated system. Such lists may assist in the management of the systems or in the allocation of resources.

It is to be understood that the comparison of managed systems to the patterns represents more than simply a Boolean test. For instance, the deviation may be quantified by annotating an isolated system with a measure that indicates the extent to which the isolated system deviates from the pattern. The measure could be based on any one or more of the following: an extent of deviation from the pattern; a degree of support for the pattern; a confidence level of the pattern; an assessment of the significance of the pattern; or, a cumulative number of patterns from which the system deviates.

Individual measures of deviation may be aggregated into a composite measure, for example, by calculating the maximum deviation, a weighted sum of deviations, or the average deviation. Regardless of how this aggregate is computed, the resulting value may be referred to as the measure of deviation.

The measure of deviation may be utilized to assign a priority value to a system that has been isolated for deviating from the pattern. The priority value may be derived from the measure of deviation. The priority values may be used to determine the significance of the deviation of individual attributes or parameters in a configuration and to target parameters and systems that are considered to exhibit significant deviation from a typical system for remedial action.

In order for the method to be executed with a reasonable level of confidence that the pattern will hold true, it is desirable to analyze a significant number of systems in order to generate a statistically reliable pattern. The larger the number of systems analyzed during determination of the pattern, the higher the degree of confidence may be associated with the pattern.

The patterns may include a confidence indicator associated with the pattern. The confidence indicator specifies how many systems the pattern applies to, and the confidence with which the pattern was applied to those systems. For example, the following confidence indicator could be associated with the pattern referred to above "with a coverage of 200 systems and a confidence of 98%". Such indicators of coverage and confidence may be used to prioritize patterns or select those patterns that are most significant to test on systems of interest.

In one embodiment, the pattern relates to operating system patches. In one particular arrangement, the method is directed to identifying systems that are missing certain operating system patches or that have such patches installed unnecessarily. The method helps to identify patches and combinations of patches that are widely accepted by a set of comparable systems and those that are not.

Where the method is employed to prioritize the allocation of support resources, the method includes an analysis of whether an operating system patch (or the lack thereof) is unusual in a system, warranting further investigation, for example by in-depth analysis by support personnel, or by making a recommendation that the system and the documentation for the patch be analysed carefully to ensure that the patch is installed for relevant reasons. In an alternative embodiment, modifications to the system may be recommended or automatically initiated.

It will be clear that in the above arrangement, it is desirable that a substantial number of systems belonging to a set of systems have at least one operating system patch installed. Using a suitable supervised machine learning algorithm, each pattern will characterize which patches or combinations of patches coexist on a significant number of comparable managed systems within the set of managed systems to be analyzed.

It should be apparent from the above example that the supervised rule learning algorithms involved in pattern determination may be relatively simple and readily intelligible to system administrators and support personnel. However, it is to be understood that the method of the present method need not be restricted to Boolean configuration attributes.

For instance, machine learning algorithms may be applied to predict integer values by various regression techniques. This may include predicting minimum or maximum threshold values by encoding a range into a set of discrete nominal values. An example of the type of system attribute that may be suitable for regression analysis is integer kernel stack size parameters.

Figure 2:
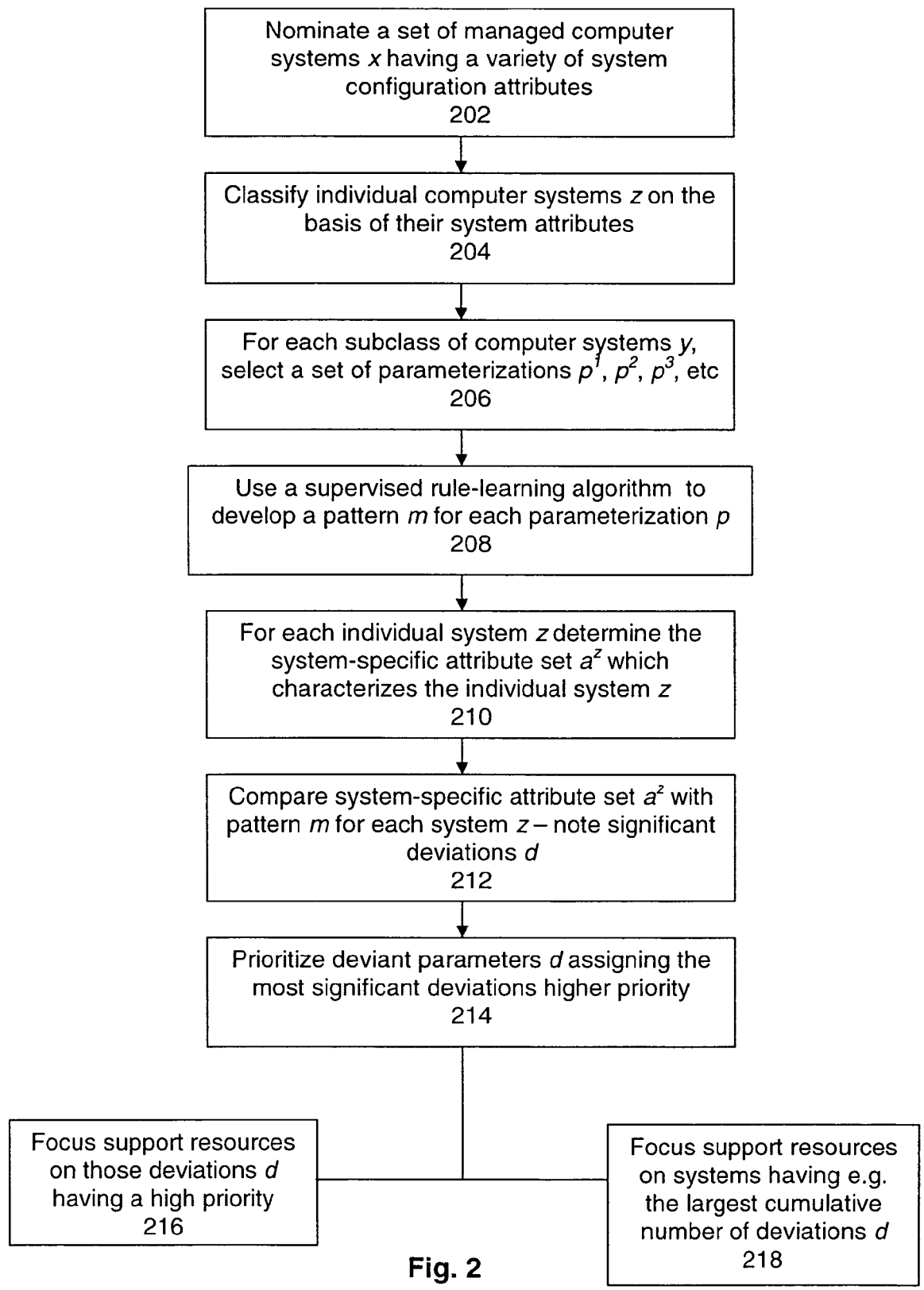
FIG. 2 is a flowchart of another embodiment of the present invention.

FIG. 2 is a flow chart of an application of the method of an embodiment of the present invention to a plurality of systems x. A set of systems making up a plurality of systems x 202 are separated into sub classes on the basis of their system attributes 204. For example, all Oracle servers may form a single sub class y. Each subclass y includes a number of individual systems z, each of which is characterized by system configuration attributes.

For the sub class y, a set of parameterizations $p^1$, $p^2$, $p^3$, etc 206 are identified. For example, $p^1$ may be a Boolean statement indicating the installation of patch PHLK283. Each parameterization p corresponds to a constraint on one or more system configuration attributes that is of interest from a system management perspective. For example, the configuration of systems that have patch PHLK283 installed may be of interest to system administrators since it is suspected that systems having this patch installed are more susceptible to errors.

A set of managed systems within a particular sub class y are used to establish a pattern m for the set of parameterizations p. Each pattern m characterizes configurations that are common amongst managed systems within the subclass 208. Note that the larger the number of managed systems used to generate the pattern m for each parameterization p, the higher the degree of confidence that may be associated with the pattern determined.

For each individual system z in subclass y, the system configuration attributes of system z are used to determine a system-specific attribute set $a^z$ in 210. The system specific-attribute set $a^z$ represents the actual values of system configuration attributes for individual systems z. These are compared to the patterns m typifying a configuration that is common amongst comparable systems. Any significant deviation from the pattern is noted 212. An example of a significant deviation d would be if the comparison of pattern m with system-specific attribute set $a^z$ indicated that patch PHLK283 has a 98% probability of being expected on system z and system z does not have patch PHLK283 installed. This result would indicate a significant deviation from configurations that are common amongst comparable systems. However, if the patch PHLK283 had a 55% probability of being installed, then no significant deviation from the common configuration is noted. Significant deviations d of individual system Z from the typical configuration of a system in the same sub class y are isolated for further analysis. The determination of significance can be determined automatically, for example using a threshold on the support for the pattern in model m, or in an assisted manner, for example by having all deviations examined by a support technician who numerically scores their importance. Another way in which significance can be determined is by having a scoring function that takes into account various possible differences and other contextual information (such as the configuration attributes of the system z) and generates a numeric or qualitative score.

Once the presence of deviations d across the systems within a subclass y of comparable systems has been established, the deviations d are prioritized by assigning more significant deviations d a higher priority value 214. The list of deviant parameters is sorted for priority for each individual system z or for all managed systems that have been examined. System management or support resources can then be focused on those parameters p and systems z that are indicated as being of higher priority than others 216. It is not necessary that all deviations be addressed, for instance, system administrators may decide that only deviations above a threshold priority warrant remedial action.

The managed systems may be sorted by some predetermined method which is not necessarily based on dealing with deviations having a highest priority value first, but rather system management or support resources may be allocated on the basis of the largest number of deviations for a single system z 118. Alternatively, the set of pattern deviations of the system z 218 can be aggregated in some way, for example, using the maximum deviation value, a weighted sum of the deviations, or an average deviation value.

The method may be used for the allocation of system management or support resources to the system or systems that are identified as deviating from the pattern that characterizes the standard configuration of comparable systems. Allocating system management or support resources in the manner described allows system administrators to proactively scan systems to ensure that they are configured according to common practice. Systems that are found not to be configured in the preferred manner may therefore be isolated and targeted for investigation and possible modification.

For instance, in the previously described example, wherein the pattern relates to operating system patches, the step of allocating resources includes an analysis of whether an operating system patch should be installed on or removed from a system, or documenting the reason for the configuration. The resource allocation may be the time taken by a system administrator to investigate the system. Systems that do not conform to common system configurations are automatically identified, and this provides an efficient means for proactive scanning of systems to ensure that all systems are configured in accordance with best practice to minimize potential adverse events such as crashes and system failure which can lead to loss of data and the like, and to avoid problems often associated with atypical non-conforming configurations such as loss of reliability, maintainability or performance.

Also provided by an embodiment of the present invention is a system for identifying exceptional managed systems amongst comparable managed systems. Each managed system has a number of system configuration attributes. A set of parameterizations provide a set of constraints on the system configuration attributes. A selection component selects a set of managed systems. A supervised machine learning algorithm determines patterns for the parameterizations. A comparison component compares the managed systems to the patterns and an isolating component isolates the managed systems that deviate from the patterns as exceptional managed systems.

In another embodiment, there is provided a system which has means for selecting a set of managed systems; means for determining patterns for a set of parameterizations representing constraints on the system configuration attributes for the selected set of managed systems, according to a supervised machine learning algorithm; means for comparing the managed systems to the patterns; and means for isolating managed systems that deviate from the patterns as exceptional managed systems.

Another embodiment provides computer data storage media having programmed thereon computer software which performs the functions of: selecting a set of managed systems, each managed system having a number of system configuration attributes; selecting a set of parameterizations relating to the managed systems; determining a pattern for each of the parameterizations based on the system configuration attributes; comparing substantially each of the managed systems to substantially each of the patterns; and isolating an exceptional managed system based on the comparing. The patterns are determined by a supervised machine learning algorithm.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed:

1. A method of identifying at least one exceptional managed computer amongst a set of comparable managed computers, the method comprising:

selecting managed computers with each of the managed computers having a plurality of system configuration attributes;

selecting parameterizations relating to one or more settings of the system configuration attributes of the managed computers;

determining patterns that characterize the parameterizations and the system configuration attributes that are common among a set of the managed computers that are comparable;

comparing substantially each of the managed computers to substantially each of the patterns; and identifying, based on the comparing, at least one exceptionally managed computer that has a parameterization that deviates from the parameterizations of the set of the managed computers that are comparable;

wherein the patterns are determined by a supervised machine learning algorithm.

2. The method of claim 1, wherein the managed computers are servers.

3. The method of claim 1, wherein the system configuration attributes include at least one of the following:
operating system patches;
active processes;
installed application software programs;
memory configuration; and
peripheral devices.

4. The method of claim 1, wherein the patterns are used to find managed computers with deviations from the parameterizations and the system configuration attributes that are common among the set of the managed computers that are comparable.

5. The method according to claim 1, wherein the patterns formulate predictions about the system configuration attributes that are common among the set of the managed computers that are comparable.

6. The method according to claim 1, wherein the parameterizations relate to operating system patches.

7. The method according to claim 1, wherein the system configuration attributes relate to hardware and software on the managed computers.

8. The method according to claim 1, further comprising looking for a pattern in the parameterizations and the system configuration attributes to determine if one of the managed computers deviates from the pattern and hence requires an operating system patch.

9. The method according to claim 1, wherein the system configuration attributes include make or model of the managed computers, operating system installed on the managed computers, and applications installed on the managed computers.

10. The method according to claim 1, wherein the supervised machine learning algorithm identifies similarities between the settings of the system configuration attributes and describes the similarities as the patterns.

11. The method according to claim 1, wherein the supervised machine learning algorithm generates the patterns to predict common system configuration attributes and find a managed computer that is an exception to the patterns.

12. A method according to claim 1, further comprising annotating an isolated system with a measure indicative of the results of the comparing, wherein the measure is based on at least one of the following:
an extent of deviation from a pattern;
a degree of support for a pattern;
a confidence level of a pattern;
an assessment of the significance of a pattern; or
a cumulative number of patterns from which the system deviates.

13. A method according to claim 12, further comprising compiling a list of isolated systems ordered in accordance with said measures.

14. A system for isolating exceptional managed computers amongst comparable managed computers, the system comprising:
a selection component that selects managed computers having configuration attributes and parameterizations that represent constraints for the configuration attributes;
a supervised machine learning algorithm that determines patterns in the parameterizations, the patterns characterizing the parameterizations and the configuration attributes that are common among a set of the managed computers that are comparable;
a comparison component that compares the managed computers to the patterns; and
an isolating component that isolates exceptionally managed computers that deviate from the patterns that characterize the set of the managed computers that are comparable.

15. The system of claim 14, wherein the configuration attributes relate to hardware and software on the managed computers.

16. The system according to claim 14, wherein the configuration attributes include attributes of the managed computers that do not change over a lifetime of the managed computers.

17. The system according to claim 14, wherein the parameterizations relate to operating system patches.

18. The system according to claim 14, wherein the patterns are used to find managed computers that have software with deviations from the set of managed computers that are comparable.

19. The system according to claim 14, further comprising a prioritization component that assigns priority values to the isolated systems, compiles a list of isolated systems, and orders the isolated systems in accordance with their priority values.

20. The system according to claim 14, wherein the supervised machine learning algorithm generates the patterns to predict parameterizations that are common to the managed computers and find a managed computer that is an exception to the patterns.

21. The system according to claim 14, wherein the managed computers are computers in an organization.

22. Computer data storage media having programmed thereon computer software which performs the following functions:
selecting managed computers with each of the managed computers having a plurality of system configuration attributes;
selecting parameterizations that are settings of the system configuration attributes of the managed computers;
determining patterns that characterize the parameterizations and the system configuration attributes that are common among a set of the managed computers;
comparing the managed computers to the patterns; and
identifying, based on the comparing, an exceptionally managed computer that has a parameterization that deviates from the parameterizations of the set of the managed computers,
wherein the patterns are determined by a supervised machine learning algorithm.

* * * * *